United States Patent
Stenberg et al.

(10) Patent No.: US 9,057,943 B2
(45) Date of Patent: Jun. 16, 2015

(54) DIRECTIONAL SOUND CAPTURING

(75) Inventors: Pär Stenberg, Verberöd (SE); Karl Ola Thörn, Limhamn (SE); Magnus Jendbro, Staffanstorp (SE); Pär-Anders Aronsson, Malmö (SE); Magnus Landqvist, Lund (SE); Martin Ek, Dalby (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 582 days.

(21) Appl. No.: 13/413,291

(22) Filed: Mar. 6, 2012

(65) Prior Publication Data

US 2012/0257036 A1 Oct. 11, 2012

Related U.S. Application Data

(60) Provisional application No. 61/472,675, filed on Apr. 7, 2011.

(30) Foreign Application Priority Data

Apr. 7, 2011 (EP) .................................... 11161466

(51) Int. Cl.
 *H04N 7/18* (2006.01)
 *G03B 31/00* (2006.01)
 *G06K 9/00* (2006.01)

(52) U.S. Cl.
 CPC ....................................... *G03B 31/00* (2013.01)

(58) Field of Classification Search
 CPC ....................................................... G03B 31/00
 USPC .............. 348/78, 77, 158, 169; 382/103, 115, 382/181, 203
 See application file for complete search history.

(56) References Cited

U.S. PATENT DOCUMENTS

| | | | | |
|---|---|---|---|---|
| 4,021,613 A | * | 5/1977 | Kennedy | 381/62 |
| 6,005,953 A | * | 12/1999 | Stuhlfelner | 381/94.3 |
| 2006/0075422 A1 | | 4/2006 | Choi et al. | |
| 2007/0246291 A1 | * | 10/2007 | Drake et al. | 181/141 |
| 2009/0043411 A1 | * | 2/2009 | Yamada et al. | 700/94 |
| 2009/0175613 A1 | * | 7/2009 | Thorn | 396/158 |
| 2012/0019662 A1 | * | 1/2012 | Maltz | 348/158 |
| 2012/0105486 A1 | * | 5/2012 | Lankford et al. | 345/661 |

FOREIGN PATENT DOCUMENTS

| | | |
|---|---|---|
| JP | 2010-122369 A | 6/2010 |
| WO | 2010/149823 A1 | 12/2010 |

OTHER PUBLICATIONS

European Search Report issued in corresponding EP application No. 11161466.5-1240, dated Jul. 15, 2011.

* cited by examiner

*Primary Examiner* — Behrooz Senfi
(74) *Attorney, Agent, or Firm* — Snyder, Clark, Lesch & Chung, LLP

(57) ABSTRACT

This disclosure is directed to a sound recording arrangement comprising a sound recording arrangement and a method in the sound recording arrangement for amplifying sounds in a primary gaze direction of the user of the sound recording arrangement. The method comprises the actions of recording sounds arriving at a sound recording unit from objects in the field of view of the user, and recording a first set of images of the head and/or the eyes of the user, and determining a primary gaze direction of the user based on the first set of images, and amplifying sounds arriving in the primary gaze direction compared to sounds arriving from other directions.

18 Claims, 3 Drawing Sheets

DIRECTIONAL SOUND CAPTURING

CROSS-REFERENCE TO RELATED APPLICATION

This application claims priority under 35 U.S.C. §119, based on U.S. Provisional Patent Application No. 61/472,675, filed Apr. 7, 2011, which is incorporated herein by reference, and EP Patent Application No. 11161466.5 filed Apr. 7, 2011.

TECHNICAL HELD

The present invention relates to the field of directional sound capturing and more particularly to a device and a method for capturing sound from a certain direction or certain directions. Particular aspects of the invention relate to directional sound capturing in a portable device.

BACKGROUND OF THE INVENTION

It is generally known that sound can be captured by means of microphones of various kinds. It is also known that sound from a particular direction can be captured by means of directional microphones with the effect that sound from a particular direction is amplified compared to sounds from other directions, and/or that sounds from other directions are attenuated compared to the sound from the particular direction.

However, directional microphones will normally capture sound in a particular fixed direction. This direction may not be the direction of interest to a user of the directional microphone, or the user of the apparatus comprising the directional microphone.

The problem that a directional microphone may only capture sound in a fixed direction may e.g. be solved by attaching the directional microphone to a movable object such that the directional microphone can be directed in various directions. However, the direction into which the directional microphone is currently directed may still not be the direction of interest to a user of the directional microphone. This is particularly so if the direction of interest is frequently changed, which e.g. may be the case if the user is interested in capture sound from a moving object such as a moving person or similar.

The problem that the direction of interest is frequently changed may e.g. be solved by attaching the directional microphone to the head of the user, such that the user may turn his head in the direction of interest with the effect that the directional microphone will capture sounds in that direction.

However, this requires that the user keeps his head turned in the direction of interest, which is not always convenient or even possible. It may e.g. be necessary for the user to listen to someone positioned in a certain direction while at the same time performing a task requiring the user to turn his head at another direction.

SUMMARY OF THE INVENTION

In view of the above there seems to be a need for an improved scheme for detecting sound from a certain direction or certain directions. Thus present invention is directed to solving the problem of providing an improved scheme for detecting sound from a certain direction or from certain directions.

This has been achieved according to a first embodiment of the present invention which provides a sound recording arrangement comprising a sound recording unit capable of operatively record sounds arriving at the sound recording unit from objects in the field of view of a user of the sound recording arrangement. The sound recording arrangement comprises a first image recording unit that is configured to operatively record a first set of images of the head and/or the eyes of the user, and a control unit that is configured to operatively determine a primary gaze direction of the user based on the first set of images, which control unit is further configured to operatively amplify sounds arriving in the primary gaze direction compared to sounds arriving from other directions.

This has also been achieved according to another embodiment of the present invention which provides a method in the sound recording arrangement for amplifying sounds in a primary gaze direction of the user of the sound recording arrangement. The method comprises the actions of recording sounds arriving at a sound recording unit from objects in the field of view of the user, and recording a first set of images of the head and/or the eyes of the user, and determining a primary gaze direction of the user based on the first set of images, and amplifying sounds arriving in the primary gaze direction compared to sounds arriving from other directions.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the methods defined by the appended claims may comprise further steps in addition to those mentioned and the steps mentioned may be performed in another sequence than the one given without departing from the present invention.

Further advantages of the present invention and embodiments thereof will appear from the following detailed description of the invention.

DETAILED DESCRIPTION OF PREFERRED EMBODIMENTS

Figure 1:
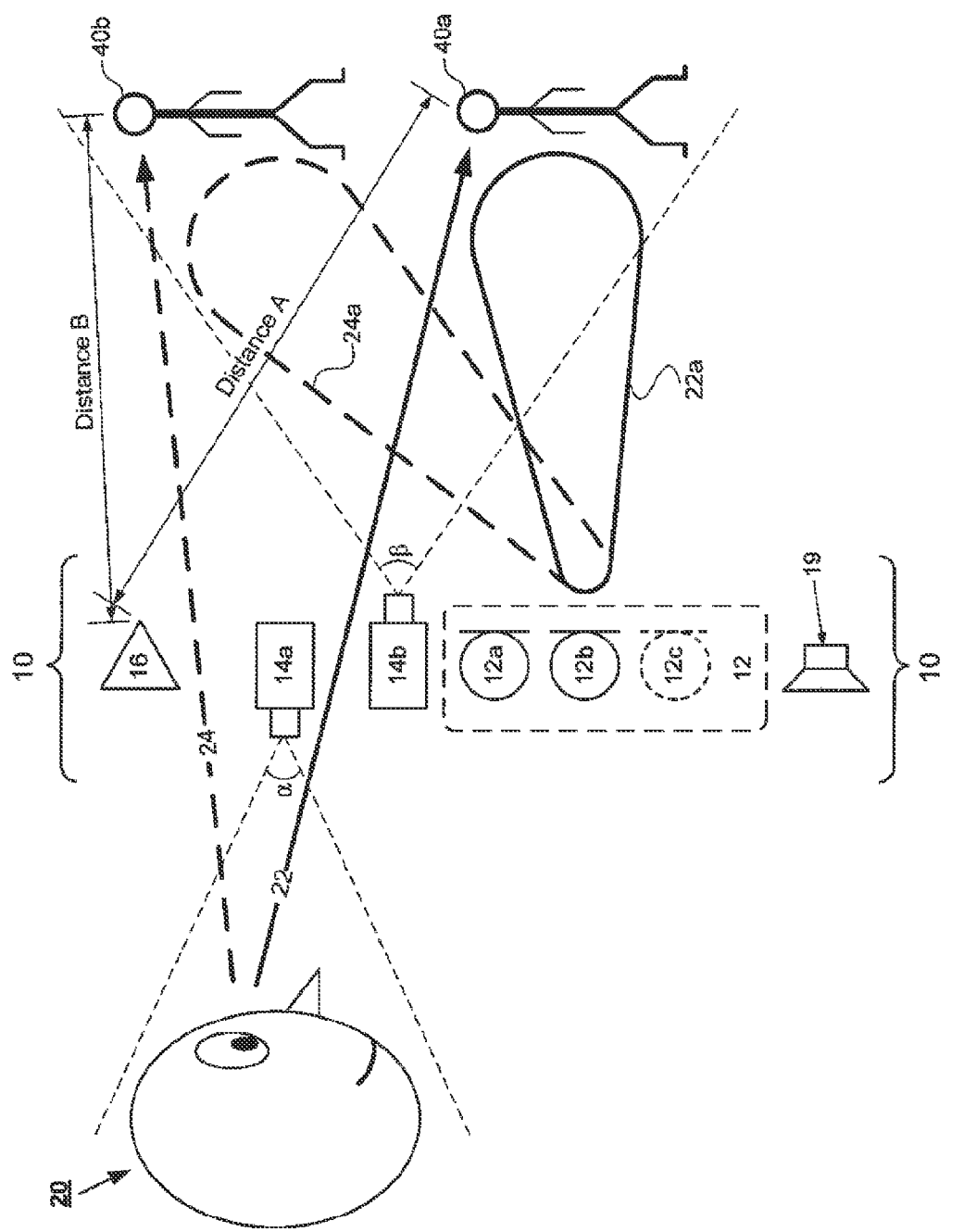
FIG. 1 shows a schematic illustration of an exemplifying scenario wherein an exemplifying sound recording arrangement 10 amplifies sounds arriving in at least one primary gaze direction 22 or 24.
Figure 2:
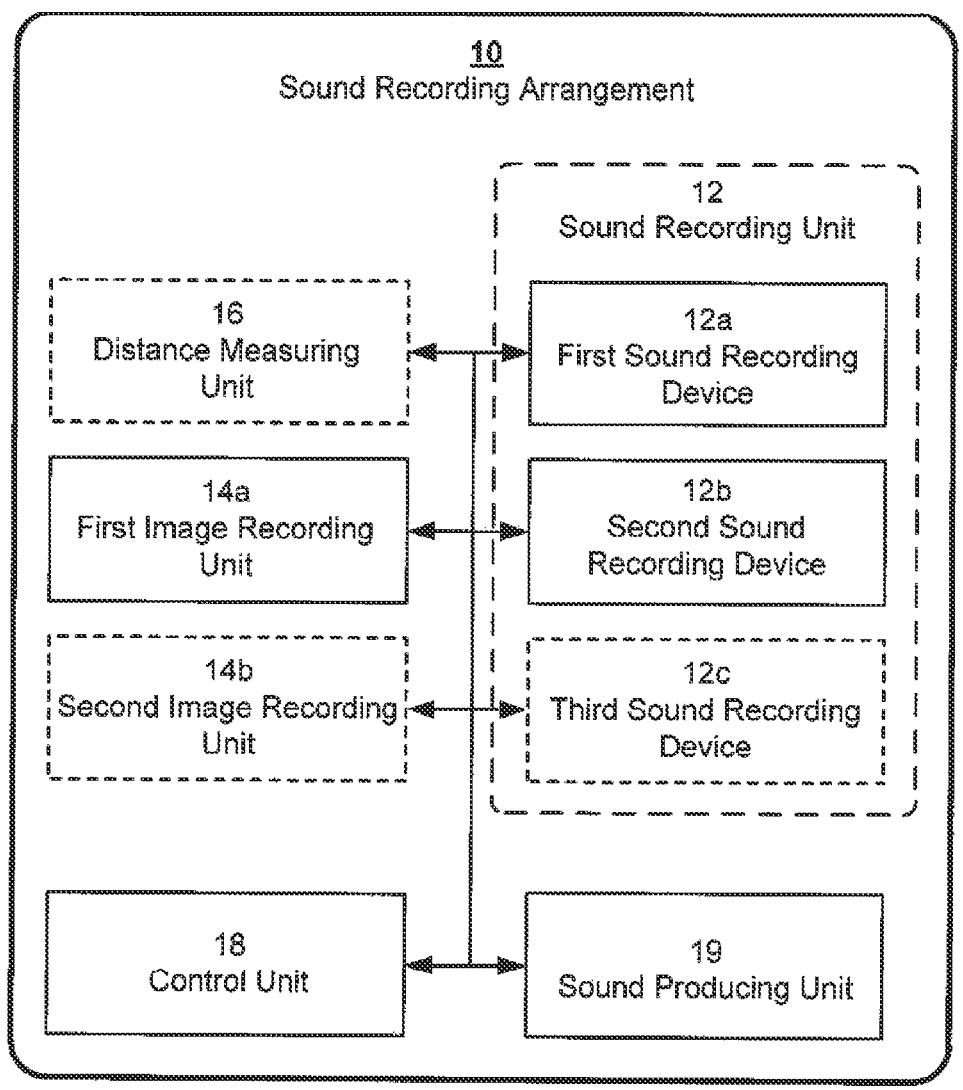
FIG. 2 is a schematic illustration of some relevant parts of the sound recording arrangement 10 in FIG. 1.

An exemplifying sound recording arrangement 10 according to an embodiment of the present solution is schematically illustrated in FIG. 1 and in FIG. 2. The sound recording arrangement 10 may be any electronic unit, e.g. a hearing aid arrangement or similar or a head set for professional use or for use during gaming activities or any other suitable sound recording and sound reproducing arrangement or similar.

The sound recording arrangement 10 comprises a sound recording unit 12 capable of operatively capture sounds arriving at the sound recording unit 12 from objects in the field of view of a user 20 of the sound recording arrangement 10, and a first image recording unit 14a configured to operatively record a first set of images of the head and/or the eyes of the user 20, and a control unit 18 that is configured to operatively determine a primary gaze direction 22 and/or 24 of the user 20 based on the first set of images, and that is further configured to operatively amplify sounds arriving in the primary gaze direction 22 and/or 24 compared to sounds arriving from other directions. This may e.g. be accomplished by amplifying sounds in the gaze direction, while sounds from other directions may be recorded without amplification. Alternatively, this may e.g. be accomplished by amplifying sounds in the gaze direction, while sounds from other directions may be attenuated. Alternatively, this may e.g. be accomplished by recording sounds in the gaze direction without amplification while sounds from other directions may be attenuated, which in fact means that sounds in the gaze direction are amplified compared to other sounds. In embodiments of the present solution it may be preferred that sounds in the gaze direction and the other sounds are mixed, while the sounds in the gaze directions are amplified compared to the other sounds. The level of amplification of the sounds in the gaze direction may be adjustable and/or set to a predetermined level, e.g. depending on the user's which and/or depending on the working environment wherein the sound recording arrangement 10 is to be used.

It is preferred that the sound recording unit 12 comprises a cluster of sound recording devices, e.g. a first sound recording device 12a and a second sound recording device 12b, e.g. arranged to operatively receive sounds omnidirectional, or within a circle sector of less than 45°, or less than 90°, or less than 135°, or less than 180°, or less than 225°, or less than 270°, or less than 315°. A person skilled in the art realizes that the direction from which sounds are arriving at the sound recording unit 12 can be determined by using the first and the second sound recording devices 12a, 12b, e.g. by comparing the timing of the sound arriving at the first sound recording device 12a and the second sound recording device 12b. This may e.g. require knowledge of the speed of sound and the distance between the first and the second sound recording units 12a, 12b etc. Similarly, person skilled in the art realizes that sounds arriving at the sound recording unit 12 can be amplified in various directions by using the first sound recording unit 12a and the second sound recording unit 12b, e.g. by varying the relative phase of the sound arriving at and recorded by the first sound recording unit 12a and the second sound recording unit 12b respectively. This is the same well known technique that is used for phased array antennas comprising a group of antennas, wherein the relative phases of the respective signals received from the antennas are varied in such a way that the effective antenna diagram of the array is reinforced in a desired direction, and typically also suppressed in undesired directions. The difference here is that a typical phased array antenna operates in the microwave spectrum, whereas the sound recording unit 12 and the two sound recording devices 12a, 12b operate in the audible spectrum. When two sound recording devices 12a, 12b then the sound recording arrangement 10 will be able to amplify sounds arriving in one angular dimension only, e.g. in azimuth (i.e. the horizontal direction) or in elevation (i.e. the vertical) direction) based on sounds recorded by the two sound recording devices 12a and 12b. However, if a third sound recording device 12c is added then the sound recording arrangement 10 will be able to amplify sounds arriving in two angular dimensions, e.g. in an azimuth (i.e. horizontal) direction and in an elevation (i.e. vertical) direction based on sounds recorded by the three sound recording devices 12a, 12b and 12c. Here, it is preferred that the three sound recording devices 12a, 12b and 12c are arranged in a non-linear fashion, e.g. arranged in a triangle pattern or according to any other suitable polygonal pattern. A skilled person having the benefit of this disclosure realizes that the sound recording unit 12 may have one, two, three or more sound recording devices. Two or more sound recording devices may e.g. be arranged in a linear fashion and/or in a polygonal fashion or similar, e.g. in a two or three dimensional array or similar.

It is preferred that the first image recording unit 14a comprises one or more camera arrangements or similar that are configured to operatively record images of the head and/or the eyes of a user 20 of the sound recording arrangement. One camera arrangement may e.g. record one eye and another camera arrangement may record the other eye of the user 20. The first image recording unit 14a may e.g. comprise one or more still cameras, e.g. a digital still camera, preferably configured to record a number of consecutive by separate images of the user 20. The first image recording unit 14a may e.g. comprise one or more motion picture cameras, e.g. a digital video camera, which is configured to continuously record the user's motions.

The sound recording arrangement 10 may also comprise a second image recording unit 14b configured to operatively record images of the field of view of the user 20 of the sound recording arrangement 10. It should be explained that the field of view of the user 20 corresponds to the whole or at least a part of the view of the surroundings that a user 20 can see while using the sound recording arrangement 10. It is preferred that the second image recording unit 14b is a camera arrangement or similar configured to operatively record images of the field of view. The second image recording unit 14b may e.g. be a still camera, e.g. a digital still camera, which is configured to record a number of consecutive by separate images of the field of view. The second image recording unit 14b may e.g. be a motion picture camera, e.g. a digital video camera, which is configured to continuously record the field of view.

The sound recording arrangement 10 may also comprise a sound producing unit 19. The sound producing unit 19 is configured to operatively provide the user 20 of the sound recording arrangement 10 with sound captured by the sound recording unit 12, wherein the sound arriving at the sound recording unit 12 in the gaze direction 22 and/or 24 of the user 20 has been amplified, as will be elaborated in more detail later. The sound producing unit 19 may be any sound producing unit that is known by those skilled in the art to be suitable for the purposes described herein. The sound producing unit 19 may e.g. comprise a loudspeaker or similar configured to operatively produce sounds that can be heard by the user 20, e.g. sounds within the frequency range of 20-20,000 Hz.

In addition, the sound recording arrangement 10 may comprise a distance measuring unit 16. The distance measuring unit 16 is configured to operatively obtain the distance to an object 40a and/or 40b in the gaze direction 22 and/or 24 respectively as will be elaborated in more detail later. The distance measuring unit 16 may be any distance measuring unit known by those skilled in the art to be suitable for the purposes described herein. The distance measuring unit 16 may e.g. comprise a sound measuring unit configured to measure distances by sending a sound pulse such as an ultrasound pulse or similar to a target and then measure the time it takes for the sound pulse to be reflected off the target and back to the unit in question. Alternatively, the distance measuring unit 16 may e.g. comprise light such as laser or infrared in a measuring unit configured to measure distances by sending a light pulse or similar to a target and then measure the time it takes for the pulse to be reflected off the target and back to the unit in question. Alternatively, the distance measuring unit 16 may e.g. comprise an autofocus arrangement which directly or indirectly provides the distance to an object 40a and/or 40b in the gaze direction 22 and/or 24 respectively being in focus. The autofocus arrangement may e.g. be a part of the second image recording unit 14b configured to operatively record images of the field of view of the user 20 of the sound recording arrangement 10. Alternatively, the distance measuring unit 16 may e.g. use images of the two eyes of a user 20 of the sound recording arrangement 10, which images are recorded by the first image recording unit 14a. The distance measuring unit 16 may then be configured to operatively estimate the distance to an object 40a and/or 40b at which the user 20 gazes by detecting the vergence of the eyes. It is well known to those skilled in the art that the vergence is the simultaneous movement of both eyes in opposite directions to obtain or maintain single binocular vision.

The control unit 18 of the sound recording arrangement 10 may be implemented using hardware and/or software, e.g. in the form of special dedicated programs running on hardware in the form of an Application-Specific Integrated Circuit (ASIC) or similar. The control unit 18 is configured to control, monitor and/or communicate with the other parts and functions of the sound recording arrangement 10 so as to perform the actions or similar of the embodiments described herein. In particular, the control unit 18 may be configured to control, monitor and/or communicate with the sound recording unit 12, the first image recording unit 14a, and the second image recording unit 14b, and the distance measuring unit 16 and the sound producing unit 19.

Before proceeding it should be added that the sound recording unit 12, the first image recording unit 14a, the second image recording unit 14b, the distance measuring unit 16, and the sound producing unit 18 may be attached to, or arranged within the sound recording arrangement 10 and/or connected to the sound recording arrangement 10. The connection may e.g. be a wired or a wireless connection.

Figure 3:
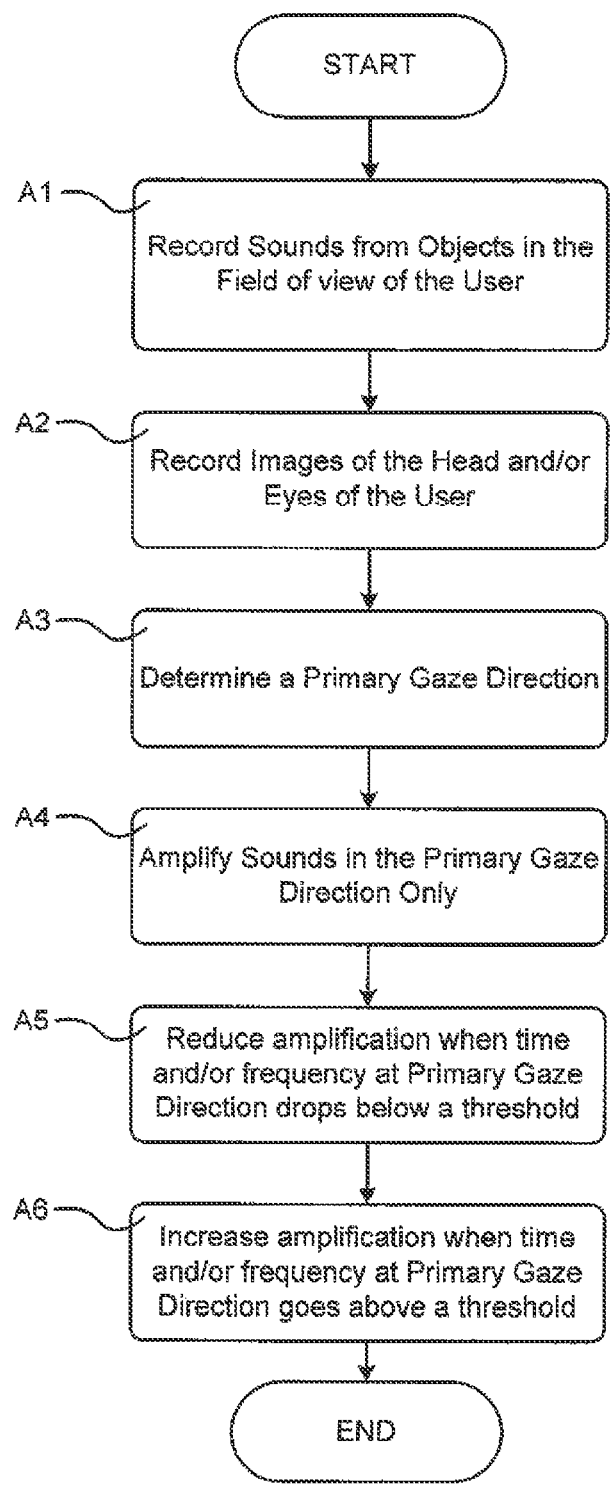
FIG. 3 is a schematic flowchart illustrating a method according to an embodiment of the present invention.

FIG. 3 is a schematic flowchart illustrating a method according to an embodiment of the present solution. The flowchart is discussed below with reference to the sound recording arrangement 10 described above with reference to FIG. 1 and FIG. 2. However, the discussion applies mutatis mutandis to all sound recording arrangement with sound recording capabilities and image recording capabilities that are configured to operatively perform the actions according to embodiments of the present solution.

In a first action A1 it is preferred that sound arriving at the sound recording unit 12 from objects in the field of view of the user 20 of the sound recording arrangement 10 is recorded by, preferably by using the sound recording unit 12. The field of view of the user 20 may correspond to the view that the user 20 may look at or is currently looking at, in other words what the user 20 may see or what the user 20 currently sees. As schematically illustrated in FIG. 1, the objects may e.g. be a first person 40a and/or a second person 40b. The user 20 may e.g. talk and/or listen to the first person 40a and/or the second person 40b.

In a second action A2 it is preferred that a first set of images of the head and/or the eyes of the user 20 is recorded, preferably by using the first image recording unit 14a.

In a third action A3 it is preferred that a primary gaze direction of the user 20 is determined based on the first set of images recorded in the second action A2. FIG. 1 schematically illustrates a first primary gaze direction 22, and a second primary gaze direction 24. In the first primary gaze direction 22 the user gazes at a first object 40a, and in the primary second gaze direction 24 the user 20 gazes at a second object 40b. A primary gaze direction is preferably determined when the user 20 repeatedly gazes in a particular direction in the field of view, and/or when the user 20 gaze in a direction in the field of view under a predetermined period. Glancing around in the field of view and/or shortly looking at an object in the field of view will not be enough to determine a primary gaze direction. As can be seen in FIG. 1, there may be one or several primary gaze directions.

The primary gaze direction is preferably determined by the control unit 18 operating on the first set of images by means of a suitable gaze tracking algorithm or similar. The gaze tracking algorithm may operate by only tracking the movements of one eye or both eyes of the user 20, e.g. in case the first set of images are recorded by a head mounted image recording unit 14a. The gaze tracking algorithm may operate by tracking the head movements and/or tracking the movements of one eye or both eyes of the user 20, e.g. in case the first set of images are recorded by a table mounted image recording unit 14a. A person skilled in the art having the benefit of this disclosure realizes that there is a wide range of well known gaze tracking algorithms suitable for the purposes described herein. Thus the particular features of suitable gaze tracking algorithms need no detailed description as such.

The control unit 18 may alternatively start the third action by determine a secondary gaze direction of the user 20 based on the first set of images, where the sound recording arrangement 10 may comprise a second image recording unit 14b configured to operatively record a second set of images of an object 40a and/or 40b in the field of view of the user 20, which object 40a and/or 40b is located in the secondary gaze direction. The control unit 18 may then determine the primary gaze direction 22 and/or 24 of the user 20 based on the first set of images as indicated above, and based on a correlation of the secondary gaze direction and the an object tracking of the object 40a and/or 40b in the second set of images. Object tracking using images or similar of an object is well known per se by those skilled in the art and it needs no further description. This makes it possible to track a moving object if you yourself are moving or a combination. By using object tracking it is possible to smoothly follow an interesting moving sound source. In case this kind of object tracking is not done there could be a bad tracking of the sound source because of the latency in detecting the interesting person/objector alternatively even loosing track of the sound source when it moves fast.

In a fourth action A4 it is preferred that only sounds in the primary gaze direction 22 and/or 24 is amplified. It is preferred that the control unit 18 is configured to operatively amplify sounds in the primary gaze direction 22 and/or 24. Other sounds outside the primary gaze direction 22 and/or 24 may alternatively or additionally be attenuated, i.e. sounds from other directions than primary gaze direction 22 and/or 24 may be attenuated. When applicable, it is preferred that the control unit 18 is configured to operatively attenuate such other sounds. In FIG. 1 an exemplifying amplification in a first primary gaze direction 22, which amplification has been indicated by a conical shape 22a, and an exemplifying amplification in a second primary gaze direction 24, which amplification has been indicated by a conical shape 24a. As can be seen, the amplification may be compensated, e.g. for parallax differences, in case the sound recording unit 12 and the user 20 are located at different positions.

As can be seen in FIG. 1 and FIG. 2, the sound recording unit 12 may comprise a cluster of at least two sound recording devices 12a, 12b or at least three sound recording devices 12a, 12b, 12c. Each sound recording device 12a, 12b, 12c is capable of operatively capture sound from objects in the field of view of the user 20. Here, it is preferred that sounds is only amplified in the primary gaze direction 22 and/or 24 in one angular dimension using said at least two sound recording devices 12a, 12b, or in two angular dimensions using said at least three sound recording devices 12a, 12b, 12c. Again it is preferred that the control unit 18 is configured to operatively amplify sounds in the primary gaze direction 22 and/or 24, and possibly to attenuate sounds outside the primary gaze direction 22 and/or 24.

As can be seen in FIG. 1 and FIG. 2, the sound recording unit 12 may comprise a distance measuring unit 16 configured to operatively obtain the distance to an object 40a and/or 40b in the primary gaze direction 22 and/or 24 respectively. Here, the control unit 18 may be configured to operatively amplify sounds in the primary gaze direction 22 and/or 24 at the distance obtained by the distance measuring unit 16. For example, using the distance information it is possible to focus on sound coming far away or closer and not indiscriminately amplify sound in a certain direction.

In a fifth action A5 it is preferred that the amplification of the sound received in the primary gaze direction 22 and/or 24 is reduced when the time during which the primary gaze direction 22 and/or 24 respectively remains the same drops below a predetermined threshold and/or the frequency at which the same primary gaze direction 22 and/or 24 is repeatedly determined drops below a predetermined threshold. In other words, if the time or frequency (or a combination) the user 20 looks at an object drops below some thresholds the amplification should be reduced. Additionally or alternatively, the amplification in a primary gaze direction 22 and/or 24 may be reduced when no sound is recorded during a predetermined period in the primary gaze direction 22 and/or 24 respectively. The amplification may be gradually reduced. Here, the control unit 18 may be configured to operatively reduce the amplification as indicated above.

In a sixth action A6 it is preferred that the amplification of the sound received in the primary gaze direction 22 and/or 24 is raised when the time during which the primary gaze direction 22 and/or 24 respectively remains the same and/or the frequency at which the primary gaze direction 22 and/or 24 respectively is repeated is above a predetermined threshold. In other words, when the time or frequency for a combination) the user 20 looks at an object 40a and/or 40b goes above some thresholds the amplification should be raised. The amplification may be gradually raised. The amplification may be immediately raised when the current primary gaze direction is the same as a previously determined primary gaze direction. Here, the control unit 18 may be configured to operatively raise the amplification as indicated above.

Generally, sound in the primary gaze direction 22 and/or 24 may be amplified even if there is currently no sound arriving at the sound recording unit 12 in the primary gaze direction 22 and/or 24 respectively.

The embodiments discussed above may be summarized in the following manner:

One embodiment of the present solution may be directed to a sound recording arrangement 10 comprising a sound recording unit 12 capable of operatively record sound arriving at the sound recording unit 12 from objects 40a and/or 40b in the field of view of a user 20 of the sound recording arrangement 10. The sound recording arrangement 10 may additionally comprise a first image recording unit 14a that is configured to operatively record a first set of images of the head and/or the eyes of the user 20, and a control unit 18 that is configured to operatively determine a primary gaze direction 22 and/or 24 of the user 20 based on the first set of images, which control unit 18 is further configured to operatively amplify sounds arriving in the primary gaze direction 22 and/or 24 compared to sounds arriving from other directions.

The control unit 18 may be configured to operatively determine a secondary gaze direction of the user 20 based on the first set of images, and the sound recording arrangement 10 may comprise a second image recording unit 14b that is configured to operatively record a second set of images of an object 40a and/or 40b located in the secondary gaze direction, and the control unit 18 is configured to operatively determine the primary gaze direction 22 and/or 24 of the user 20 based on the first set of images and based on a correlation of the secondary gaze direction and an object tracking of the object 40a and/or 40b in the second set of images.

The sound recording unit 12 may comprise a cluster of at least two sound recording devices 12a and 12b or at least three sound recording devices 12a, 12b and 12c, each capable of operatively record sounds from objects in the field of view of a user 20. Here, the control unit 18 may be configured to operatively amplify sounds in the primary gaze direction 22 and/or 24 in one angular dimension using said at least two sound recording devices 12a and 12b, or in two angular dimensions using said at least three sound recording devices 12a, 12b and 12c.

The sound recording arrangement 10 may comprise a distance measuring unit 16 that is configured to operatively obtain the distance to an object 40a and/or 40b in the primary gaze direction 22 and/or 24. Here, the control unit 18 may be configured to operatively amplify sounds in the primary gaze direction 22 and/or 24 at the distance obtained by the distance measuring unit 16.

The control unit 18 of the sound recording arrangement 10 may be configured to operatively reduce the amplification when the time during which the primary gaze direction 22 and/or 24 remains the same drops below a predetermined threshold and/or the frequency at which the same primary gaze direction 22 and/or 24 is repeatedly determined drops below a predetermined threshold.

The control unit 18 of the sound recording arrangement 10 may be configured to operatively reduce the amplification when no sound is recorded in the primary gaze direction 22 and/or 24 during a predetermined period.

The control unit 18 of the sound recording arrangement 10 may be configured to operatively raise the amplification when the time during which the primary gaze direction 22 and/or 24 remains the same, and/or the frequency at which the primary gaze direction 22 and/or 24 is repeated goes above a predetermined threshold.

The control unit 18 of the sound recording arrangement 10 may be configured to operatively raise the amplification gradually.

The control unit 18 of the sound recording arrangement 10 may be configured to operatively raise the amplification immediately when the current primary gaze direction 22 and/or 24 is the same as a previously determined primary gaze direction.

The control unit 18 of the sound recording arrangement 10 may be configured to operatively amplify sounds in the primary gaze direction 22 and/or 24 even if there is currently no sound arriving at the sound recording unit 12 in the primary gaze direction 22 and/or 24.

The embodiments discussed above may be summarized in the following manner:

One embodiment of the present solution may be directed to a method in the sound recording arrangement 10 for amplifying sounds in a primary gaze direction of the user 20 of the sound recording arrangement 10. The method may comprise the actions of recording sounds arriving at the sound recording unit 12 from objects 40a and/or 40b in the field of view of the user 20, and recording a first set of images of the head and/or the eyes of the user 20, and determining a primary gaze direction 22 and/or 24 of the user 20 based on the first set of images, and amplifying sounds arriving in the primary gaze direction 22 and/or 24 compared to sounds arriving from other directions.

The method may also comprise the actions of determining a secondary gaze direction of the user 20 based on the first set of images, and determining the primary gaze direction 22 and/or 24 of the user 20 based on the first set of images and based on a correlation of the secondary gaze direction and an object tracking of the object 40a and/or 40b in the second set of images.

The method may also comprise the actions of recording the sounds from objects in the field of view of a user 20 using at least two sound recording devices 12a and 12b, or using at least three sound recording devices 12a, 12b and 12c, and then amplifying sounds in the primary gaze direction 22 and/or 24 in one angular dimension based on sounds recorded from said at least two sound recording devices 12a and 12b, or in two angular dimensions based on sounds recorded from said at least three sound recording devices 12a, 12b and 12c.

The method may also comprise the actions of obtaining the distance to an object 40a and/or 40b in the primary gaze direction 22 and/or 24 respectively, and amplifying sounds in the primary gaze direction 22 and/or 24 respectively at the distance obtained by the distance measuring unit 16.

The method may also comprise the actions of reducing the amplification when the time during which the primary gaze direction 22 and/or 24 remains the same drops below a predetermined threshold, and/or the frequency at which the same primary gaze direction 22 and/or 24 is repeatedly determined, drops below a predetermined threshold.

The method may also comprise the actions of reducing the amplification when no sound is recorded in the primary gaze direction 22 and/or 24 during a predetermined period.

The method may also comprise the actions of raising the amplification when the time during which the primary gaze direction 22 and/or 24 remains the same, and/or the frequency at which the primary gaze direction 22 and/or 24 is repeated, goes above predetermined threshold.

The method may also comprise the actions of raising the amplification gradually.

The method may also comprise the actions of raising the amplification immediately when the current primary gaze direction 22 and/or 24 is the same as a previously determined primary gaze direction.

The method may comprise the actions of amplifying sounds in the primary gaze direction 22 and/or 24 even if there is currently no sound arriving at the sound recording unit 12 in the primary gaze direction 22 and/or 24.

The present invention has now been described with reference to exemplifying embodiments. However, the invention is not limited to the embodiments described herein. On the contrary, the full extent of the invention is only determined by the scope of the appended claims.

The invention claimed is:

1. A sound recording arrangement comprising:
    a sound recording unit configured to record sound arriving at the sound recording unit from objects in a field of view of a user of the sound recording arrangement,
    a first image recording unit configured to operatively record a first set of images of a head or eyes of the user,
    a second image recording unit configured to operatively record a second set of images of an object located in a secondary gaze direction of the user, and
    a control unit configured to:
        determine the secondary gaze direction of the user based on the first set of images,
        determine a primary gaze direction of the user based on the first set of images and based on a correlation of the secondary gaze direction and an object tracking of the object in the second set of images, and
        amplify sounds arriving in the primary gaze direction compared to sounds arriving from other directions.

2. The sound recording arrangement according to claim 1, wherein:
    the sound recording unit comprises a cluster of at least two sound recording devices or at least three sound recording devices each configured to record sounds from objects in the field of view of a user, and
    wherein the control unit is configured to operatively amplify sounds in the primary gaze direction in one angular dimension using said at least two sound recording devices, or in two angular dimensions using said at least three sound recording devices.

3. The sound recording arrangement according to claim 1, comprising a distance measuring unit configured to operatively obtain a distance to an object in the primary gaze direction, wherein:
    the control unit is configured to operatively amplify sounds in the primary gaze direction at the distance obtained by the distance measuring unit.

4. The sound recording arrangement according to claim 1, wherein:
    the control unit is configured to operatively reduce the amplification when a time during which the primary gaze direction remains constant drops below a first threshold or a frequency at which the primary gaze direction is repeatedly determined drops below a second threshold.

5. The sound recording arrangement according to claim 1, wherein:
    the control unit is configured to operatively reduce the amplification when no sound is recorded in the primary gaze direction during a predetermined period.

6. The sound recording arrangement according to claim 1, wherein:
    the control unit is configured to operatively raise the amplification when a time during which the primary gaze direction remains constant or a frequency at which the primary gaze direction is repeated goes above a threshold.

7. The sound recording arrangement according to claim 6, wherein:
    the control unit is configured to operatively raise the amplification gradually.

8. The sound recording arrangement according to claim 7, wherein:
    the control unit is configured to operatively raise the amplification immediately when a current primary gaze direction matches a previously determined primary gaze direction.

9. The sound recording arrangement according to claim 1, wherein:
    the control unit is configured to operatively amplify sounds in the primary gaze direction even if there is currently no sound arriving at the sound recording unit in the primary gaze direction.

10. A method in a sound recording arrangement for amplifying sounds in a primary gaze direction of a user of the sound recording arrangement, the method comprising:
    recording sounds arriving at a sound recording unit from objects in a field of view of the user, recording a first set of images of a head or eyes of the user,
determining a secondary gaze direction of the user based on the first set of images,
recording a second set of images of an object located in the secondary gaze direction,
determining a primary gaze direction of the user based on the first set of images and based on a correlation of the secondary gaze direction and an object tracking of the object in the second set of images, and
amplifying sounds arriving in the primary gaze direction compared to sounds arriving from other directions.

11. The method according to claim 10, wherein the method further comprises:
recording the sounds from objects in the field of view of a user using at least two sound recording devices, or using at least three sound recording devices, and
amplifying sounds in the primary gaze direction in one angular dimension based on sounds recorded from said at least two sound recording devices, or in two angular dimensions based on sounds recorded from said at least three sound recording devices.

12. The method according to claim 10, wherein the method further comprises:
obtaining a distance to an object in the primary gaze direction,
amplifying sounds in the primary gaze direction at the distance.

13. The method according to claim 10, wherein the method further comprises:
reducing the amplification of the sounds arriving in the primary gaze direction when a time during which the primary gaze direction remains constant drops below a first threshold or a frequency at which the primary gaze direction is repeatedly determined drops below a second threshold.

14. The method according to claim 10, wherein the method further comprises:
reducing the amplification of the sounds arriving in the primary gaze direction when no sound is recorded in the primary gaze direction during a predetermined period.

15. The method according to claim 10, wherein the method further comprises:
raising the amplification of the sounds arriving in the primary gaze direction when a time during which the primary gaze direction remains constant or a frequency at which the primary gaze direction is repeated goes above a predetermined threshold.

16. The method according to claim 15, wherein the method further comprises:
raising the amplification gradually.

17. The method according to claim 15, wherein the method further comprises:
raising the amplification immediately when a current primary gaze direction matches a previously determined primary gaze direction.

18. The method according to claim 10, wherein the method further comprises:
amplifying sounds in the primary gaze direction even if there is currently no sound arriving at the sound recording unit in the primary gaze direction.

* * * * *